US011733030B2

(12) United States Patent
Strikovski et al.

(10) Patent No.: US 11,733,030 B2
(45) Date of Patent: Aug. 22, 2023

(54) METHOD AND APPARATUS FOR CONTACTLESS HIGH-RESOLUTION DETERMINATION AND CONTROL OF AN OBJECT POSITION

(71) Applicant: NEOCERA, LLC, Beltsville, MD (US)

(72) Inventors: Mikhail D. Strikovski, Spring, TX (US); Steven L. Garrahan, Odessa, FL (US); Jonathan E. Parkinson, Ellicot City, MD (US); Jeonggoo Kim, Laurel, MD (US); Solomon Kolagani, Ellicott City, MD (US)

(73) Assignee: Neocera, LLC, Beltsville, MD (US)

( * ) Notice: Subject to any disclaimer, the term of this patent is extended or adjusted under 35 U.S.C. 154(b) by 246 days.

(21) Appl. No.: 17/309,491

(22) PCT Filed: Dec. 10, 2019

(86) PCT No.: PCT/US2019/065428
§ 371 (c)(1),
(2) Date: Jun. 1, 2021

(87) PCT Pub. No.: WO2020/123474
PCT Pub. Date: Jun. 18, 2020

(65) Prior Publication Data

US 2022/0042787 A1 Feb. 10, 2022

Related U.S. Application Data

(60) Provisional application No. 62/777,498, filed on Dec. 10, 2018.

(51) Int. Cl.

| | |
|---|---|
| ***G01B 11/02*** | (2006.01) |
| ***G01B 11/03*** | (2006.01) |
| ***G01B 11/14*** | (2006.01) |

(52) U.S. Cl.
CPC ............ *G01B 11/026* (2013.01); *G01B 11/03* (2013.01); *G01B 11/14* (2013.01)

(58) Field of Classification Search
CPC ... G01C 3/00; G01C 3/02; G01C 3/22; G01C 3/32; G01C 5/00; G01C 5/02;
(Continued)

(56) References Cited

U.S. PATENT DOCUMENTS 4,864,123 A * 9/1989 Mizutani ................. G01S 7/499 356/369
4,976,543 A 12/1990 Scheck et al.
(Continued)

FOREIGN PATENT DOCUMENTS

| | | | | |
|---|---|---|---|---|
| CN | 108844466 B | * 11/2019 | ............ G01B 11/02 |
| JP | 2010230400 A | * 10/2010 | |
| KR | 20130040029 A | * 10/2011 | |

OTHER PUBLICATIONS

Riftek Laser Triangulation Sensors, https://riftek.com/products/laser_triangulation_sensor/ (last visited Jun. 30, 2021).
(Continued)

*Primary Examiner* — Gordon J Stock, Jr.
(74) *Attorney, Agent, or Firm* — Rosenberg, Klein & Lee

(57) ABSTRACT

A high-sensitivity optical system to determine and/or control spatial displacement and position of objects applicable to various situations when a contact measurement cannot be performed, such as in high-vacuum or ultra-high vacuum chambers, at high temperatures, in aggressive chemical environments, etc. A laser beam is directed at a low glancing angle to a screen secured to an object. The screen's surface is normal to a motion direction of interest. A location of the bright laser beam spot on the screen surface is acquired and the displacement thereof is analyzed and quantified based on the change in distance from the laser beam spot to a reference element which is arranged on the screen and
(Continued)

creates a variation in the acquired image brightness. A feedback loop control mechanism is provided which returns the displaced object to its original position.

20 Claims, 6 Drawing Sheets

(58) Field of Classification Search
CPC ..... G01B 11/002; G01B 11/02; G01B 11/022; G01B 11/024; G01B 11/026; G01B 11/028; G01B 11/03; G01B 11/14; G01B 11/22; G01H 9/00; G01S 17/06; G01S 17/08; G01S 17/32; G01S 17/42; G01S 17/46; G01S 17/48
See application file for complete search history.

(56) References Cited

U.S. PATENT DOCUMENTS 5,523,844 A * 6/1996 Hasegawa ............ G01B 11/026 385/14
5,631,738 A * 5/1997 Childers ................ G01S 17/46 356/612
5,699,158 A 12/1997 Negishi
6,593,587 B2 7/2003 Pease
6,812,479 B2 * 11/2004 Joffe .................... G01B 11/028 250/559.31
7,327,474 B2 2/2008 Chien
7,554,677 B2 * 6/2009 Chien ...................... G01H 9/00 356/614
8,144,339 B2 * 3/2012 Hwang .................. G01B 11/14 356/498
8,547,559 B2 * 10/2013 Kito ...................... H01L 21/681 356/614
8,760,635 B2 6/2014 Fukuhara
9,651,369 B1 5/2017 Strikovski et al.
9,976,848 B2 * 5/2018 Li .......................... G01B 11/25
10,436,905 B2 * 10/2019 Hageney .............. G01B 11/272
2010/0277748 A1 * 11/2010 Potapenko ........... G01B 11/026 356/623

OTHER PUBLICATIONS

Feature description for Antaris Long Standoff Laser Triangulation Sensor for Hot Applications, https://scantronltd.co.uk/product/antaris/ (last visited Jun. 30, 2021).
Datasheet for optoNCDT 1710 Long-range Laser Sensor (retrieved from https://www.micro-epsilon.com/displacement-position-sensors/laser-sensor/Longrange-Laser-sensors/ on Jun. 30, 2021).

* cited by examiner

METHOD AND APPARATUS FOR CONTACTLESS HIGH-RESOLUTION DETERMINATION AND CONTROL OF AN OBJECT POSITION

REFERENCE TO RELATED PATENT APPLICATION(S)

This Utility Patent Application is a National Stage Application of PCT/US2019/065428 filed on 10 Dec. 2019 which is based on Provisional Patent Application No. 62/777,498 filed on 10 Dec. 2018.

FIELD OF INVENTION

The present invention relates to a method and a system adapted to determine and control the position of an object.

Specifically, the present invention is directed to detection and control of small displacement of objects respective to stationary reference objects.

More specifically, the present invention relates to a high-resolution contactless positioning technique to determine and/or to control spatial location of objects in situations when mechanical measurements cannot be conducted using contact measurement methods, such as, for example, for processes conducted within High-Vacuum (HV) or Ultra-High-Vacuum (UHV) chambers, as well as at high temperature or aggressive chemical environments, etc.

BACKGROUND AND PRIOR ART

Control over a spatial position of mechanical objects is critically important in numerous industrial applications, including, for example, fabrication of fine parts or printed circuit boards, as well as for monitoring of a distance to/or between small fragile parts.

Techniques for measuring a distance to an object, and detection of the object position, or its displacement, are of a great practical importance in various applications. Typically, a three-dimensional position of an object can be defined by the distance of an indicia on the object surface from reference surfaces which usually remain stationary. Change in the indicia position characterizes the object displacement.

An optical method of Laser Triangulation is used as a basis of a number of measurement tools. In the Laser Triangulation measurement approach, typically, a laser diode generates a beam of light which is focused onto an object surface to form a bright spot which serves as an indicia point. An optical receiver collects the visible light from the spot (indicia) on the surface, and converts the collected visible light signals into a spot image onto a linear array of photo-sensitive elements. A displacement of the object causes the corresponding shift of location of the spot image on the array of photo-sensitive elements relative to the array frame. A signal processor is connected to the photo-sensitive elements to compute a distance to the object, as well as the object displacement, based on the shift of the spot image location.

In optical triangulation methodology, the laser beam is incident onto object surface in a nearly perpendicular direction to the surface. The distance to the object, as well as the displacement of the object, are measured along the direction of the laser beam. The actual location of the laser spot on the object surface does not change as the objects move along the laser beam. Instead, the triangulation approach uses the change in the direction (angle) at which the light from the bright spot arrives to the collection optics (the array of photo-sensitive elements). The collection angle changes as the object moves as well as the location of the spot image registered by the array of the photo-sensitive elements.

In optical triangulation methodology, the amount of the shift of the spot image relative the array frame is calibrated and is recorded in terms of the object spatial displacement. However, the optical triangulation approach does not typically examine the position of the actual laser beam spot on the object's surface of interest relative to other objects.

The optical triangulation method requires that the direction of the light collection to be different from the direction of incident laser beam. Thus, there is always a spatial separation between the laser source and the sensitive (photo-sensitive) element in the optical triangulation instruments. The size of the spatial separation defines the calibration, working distance, and resolution of the instrument.

There is variety of optical triangulation tools which use different working distances to the object and which have different displacement resolutions (the resolution is the minimum value of an object displacement which an instrument is capable of registering). For optical triangulation tools using a longer working distance, a greater separation between the laser diode and the sensitive element in the measurement instrument is needed in order to facilitate a required resolution.

For example, a separation between the laser diode output and the camera optics input as large as ~150 mm is typical in some instruments intended to operate at ~500 mm distance. Disadvantageously, application of such measurement tools to control a position of objects in vacuum chamber systems is problematic, as it would require either a single window of an impractically large size (for example, exceeding 150 mm in diameter), or a system with two separate chamber optical windows (one for the diode laser input and another for the reflected light output), which is not an optimal design for high-vacuum (HV) or ultra high-vacuum (UHV) vacuum chambers.

Machine vision tools are used for a broad spectrum of applications including automatic alignment of objects, edge detection, targeting and pointing, dimensional scanning, etc. To serve such a broad functionality, the machine vision tools are designed with different geometrical arrangements of light source, illumination, and image acquisition.

The common component of the machine vision tools is the "vision" element which is essentially a picture (image) of an object acquired and digitized by a camera. Depending on a particular application, the image is processed by a specialized vision software which acquires and manipulates the region of interest in the image, interprets the pixel-by-pixel data, and outputs the information of interest.

A typical object displacement resolution of optical triangulation tools with the working distance of ~500 mm is about 0.01-0.02% of the distance, that is 50-100 μm. While sufficient for many applications, a better resolution is desirable in some instruments in order to detect smaller displacements of objects. Such capability is critically important in analytical instruments which use beams incident on surface at low glancing angle such as, for example, electron beams in RHEED (Reflection High Energy Electron Diffraction) technique, or other radiation beams in the surface diagnostics and analysis instruments. Many of those tools operate within HV (high vacuum) or UHV (ultra high-vacuum) systems, where acceptable options for suitable positioning instrumentation are limited.

It therefore would be highly desirable to develop a method and system for detection and control of a position of mechanical objects which is adapted for application in HV and UHV chambers, and which can attain sufficient spatial position resolution suitable for in-situ analytical techniques.

SUMMARY OF THE INVENTION

It is therefore an object of the present invention to provide a method and an apparatus which would advantageously be free of shortcomings of conventional systems for optical detection and control of small displacements of objects of interest.

It is another object of the present invention to provide a method for optical (contactless) detection of small displacements and position control of objects which relies neither on the location of an optical beam image spot relative to the sensor array frame, nor requires a significant separation of laser source and imaging optics which are typical for optical triangulation techniques while providing a displacement resolution of better than 20 μm at approximately ~500 mm working distance.

It is a further object of the present invention to provide a method for an object's small displacement detection and control which is based on a unique arrangement between a laser beam and an object's surface. This arrangement is realized by using a laser beam incident at low glancing angle relative to the object's surface which is oriented substantially perpendicular to a direction of a displacement of interest. In such an arrangement, the location of the focused laser beam spot on the object's surface is very sensitive and is directly-related to displacements of the object's surface in the direction normal to the object's surface.

It is an additional object of the present invention to provide contactless detection of small displacements of an object of interest, in which a change in the laser spot location on the object's surface, caused by a shift of the object, is detected and precisely quantified through a quantitative relation between the laser spot displacement and the object displacement.

In one aspect, the present invention addresses a method in which a focused laser beam is directed to an object's surface at a low glancing incidence angle (about 5°), and where the object's surface in question is positioned substantially in a normal orientation to the object motion direction of interest.

In the subject method, optical images of the laser spot and the object's surface are acquired, and the location of the spot is analyzed relative to a reference element on the object's surface. An element which creates a variation in the image brightness can serve as the reference element in the subject method. It may be a dark (or light) line, or groove, etc., on a surface recognizable in an image.

In the subject method, the surface in question can belong to the object itself, or can be provided separately from the object's surface specifically to serve as a screen for the laser spot. The screen is preferably oriented with its normal directed along the direction of movement of interest, and is solidly attached to the object.

Displacement of the object's surface relative to a stationary base of the system, in any direction, except along the incident laser beam, is detected as a shift in the laser spot location on the object's surface. The method exhibits the highest sensitivity to the movement of the object in a direction when the probing laser beam is incident at a low glancing angle to an object's surface normal to this direction of interest.

In the present method, the laser beam is preferably arranged to remain stationary relative to a base of the system in question.

The spot position on the object's surface (or the screen) is quantified by a distance from the laser spot to a reference element on the surface. In the preferred embodiment, an edge of the screen surface may serve as the reference element (line).

Illumination means are provided to create a required brightness of the essential elements to be within the "dynamic range of gray" of the camera, while providing a sufficient contrast between them. The laser spot is usually the brightest element in the image. Its brightness has to be just below the saturation level (100% brightness of the dynamic range) of the camera.

The brightness of the screen element is adjusted by using an illuminator providing a lower brightness than that of the laser spot sufficient to enable profiling of the laser spot brightness and determination of the position of the brightness maximum. The reference element, in the preferred embodiment, may be in the form of a brightness contrast line between the brightness of the screen and the brightness of the background, which corresponds to the zero-brightness (black) level in the image.

The subject method also includes an image processing procedure which (a) selects a region of interest within an image frame, (b) determines a position of the laser spot maximum (for example, in image pixel units), (c) determines a position of the reference element (for example, the screen edge line), and (d) determines a distance between the maximum of the laser spot brightness and the line (for example, in image pixel units).

The subject method further addresses a fixed-point bilinear interpolation algorithm to locate the screen edge line to within sub-pixel accuracy.

The current method also includes calculation of the object displacement (shift) dZ, in a direction normal to the screen surface orientation, based on the measured laser spot shift dX.

The subject method uses equation (Eq. 1) in the displacement computation $$dZ = dX \cdot \tan(\varphi) \quad \text{(Eq. 1)}$$

where φ is the glancing angle of the incident laser beam.

The camera pixel size factor (mm/pixel) converts the laser spot shift value dX to an actual shift distance dZ in millimeter units. As $\tan(\varphi) \ll 1$ for low glancing angles, the object shift dZ of 10-20 times smaller than the spot shift dX can be detected and measured.

For example, in one of the embodiments, a reliably measured shift of dX=0.2 mm may be used to detect and control the position of an object (Z) with ~0.02 mm precision.

In another aspect, the present invention addresses a system configured for detection and control of 3-dimensional (3D) small movements of mechanical components. To attain the 3D position/displacement detection and control, the subject system is equipped with the laser(s), screen(s), and camera(s) arranged in three orthogonal planes each relative to another.

The subject methodology can be embedded, for example, in a vacuum chamber with a single small size window. In such implementation, a reference element is present in the image itself (unlike the laser spot location referenced to an image frame in the triangulation method which requires significant, ~150 mm, separation between the laser and the camera).

In this application, a mirror is preferably arranged inside the chamber. The mirror may be specifically oriented to reflect light from the laser spot and the screen, and to direct the reflected light to the camera located near the laser. In such an arrangement, the camera "views" the laser spot and the screen in an optimal (nearly perpendicular to the screen) orientation, thus permitting the acquisition of an image of sufficient quality.

In the application with vacuum systems, the present approach allows for a single, small size viewport to serve the functions of both: the (a) laser beam entrance window, and (b) the camera viewport, which may be as small as 50 mm in diameter.

Preferably, the subject methodology for detection and displacement of an object in a predetermined direction of interest may be carried out through the steps of:

(a) attaching a screen member to an object under study. The screen member has a surface disposed substantially perpendicular to a predetermined motion direction of interest of the object under study;

(b) providing a light emitting unit for generating a light beam;

(c) directing the light beam to the surface of the screen at a small incident glancing angle φ between the light beam and the surface of the screen member. The light beam creates a light beam spot at a position A on the surface of the screen. The position A corresponds to an original position of the object under study. Upon a displacement dZ of the object along the predetermined direction of interest, the light beam spot displaces a distance dX along the surface of the screen to a position B. The position B of the light beam spot corresponds to a displaced position of the object under study;

(d) measuring the distance dX; and (e) computing the displacement dZ of the object under study in correspondence to the distance dX and the incident glancing angle.

The subject method further assumes the steps of:

operatively coupling a camera to the surface of the screen member to acquire optical images of the surface of the screen member containing the light beam spot at the position A and at least the position B;

operatively coupling a data processor sub-system to the camera, the data processor sub-system being configured for analyzing the acquired optical images of the surface of the screen member, and detecting the displacement of the light beam spot from the position A to the position B.

In the present method, a data processor sub-system is operatively coupled to the light emitting unit to maintain the incident glancing angle φ of the light beam on the screen surface substantially constant.

The subject method is enhanced by the capabilities of:

controlling the feedback loop by the data processor sub-system to displace the object under study to its original position, and detecting the return of the object under study to the original position when the light beam spot returns from the position B to the position A.

For this, the subject method further assumes the steps of: operatively coupling a feedback loop sub-system to the data processor sub-system and the object under study. The feedback loop sub-system preferably includes a driving mechanism coupled to the object under study for its controlled displacement.

The feedback loop sub-system, under control of the data processor sub-system, displaces the object under study to its original position upon the displacement of the light beam spot from the position A to the position B has been detected by the data processor sub-system.

The subject method also assumes the steps of:

coupling a variable intensity illuminator to the surface of the screen member, and operatively coupling the data processor sub-system to the variable intensity illuminator to control a brightness of the screen member's surface illumination.

The data processor sub-system is preferably configured to process a first acquired optical image corresponding to the original position of the object under study to determine a first maximum brightness location and a first brightness transition reference location at the acquired optical image, and computing a reference distance between the first maximum brightness location and the first brightness transition reference location.

The subject method, further comprises:

processing, by the data processor sub-system, at least a second acquired optical image to determine a second maximum brightness location and a second brightness transition reference location at the at least second acquired optical image, computing an adjusted distance between the second maximum brightness location and the second brightness transition location at the second acquired optical image, computing, by the data processor sub-system, a difference between the reference distance of the first acquired optical image and the adjusted distance of the second acquired optical image, and controlling the feedback loop mechanism by the data processor sub-system to adjust position of the object under study if the difference between the reference distance and the adjusted distance deviates from zero.

Prior to determining the reference distance, the method assumes the operation of selecting, by the data processor sub-system, a region of interest (ROI) on the first acquired optical image. The ROI includes an X-Y array of individual pixels of the first acquired optical image having substantially a rectangular contour including a bottom edge of the screen member constituting a Reference Edge, right and left opposite sides disposed in parallel to a field of view of the camera, and the light beam spot, beginning from the left (or right) side of the ROI, scanning brightness of each vertical column of the individual pixels of said array thereof, and determining a location of the Reference Edge within the each vertical column of the individual pixels by a fixed-point bi-linear interpolation routine.

The method operates by scanning each vertical column of the individual pixels of the array thereof for a maximum value of the brightness thereof, wherein the location of the light beam spot corresponds to a pixel having the maximum brightness.

The subject method further comprises the routine of drawing, by the data processor sub-system, a straight vertical line connecting the pixel of the maximum brightness and the Reference Edge, wherein a distance between the pixel of the maximum brightness and the Reference Edge about the vertical line is the Reference Distance.

In one of numerous applications, the subject method may be adapted for UV and/or UHV chambers, where the present method further includes the steps of positioning the object under study in the form of a substrate on a substrate holder in a vacuum chamber, providing the chamber with a single optical window, positioning the screen member on the substrate holder, positioning the light emitting source, illuminator and camera outside the vacuum chamber, directing the light beam from the light emitting source, and light from the illuminator through the optical window on the screen member, and aligning the field of view of the camera with the window, wherein the glancing angle may be as small as about 5 degrees.

The subject method is enhanced by positioning a mirror in proximity to the screen member to attain reflection of the light produced by the illuminator to the screen member to control the screen member's surface brightness, and supporting a light collection channel to obtain the optical image created by the light beam spot, light from screen, light from a background field reflected by the mirror to the camera, where the light collection channel is substantially parallel to the light beam.

In a further aspect, the subject invention addresses a system for detection of a displacement of an object under study in a predetermined direction of interest, which is adapted for controlling the object position, specifically in surface analysis systems using low glancing angle incident beams.

The subject system is built by attaching a screen member to an object under study. The screen member has a surface disposed substantially perpendicular to a predetermined direction of interest of the object under study.

The system also is equipped with a light emitting unit for generating a light beam. The light beam is directed to the surface of the screen member at a small incident glancing angle φ between the light beam and the surface of the screen. The light beam creates a light beam spot at position A on the surface of the screen member. The position A corresponds to an original position of the object under study. Upon a displacement dZ of the object along the predetermined direction of interest, the light beam spot displaces a distance dX along the surface of the screen member to a position B. The position B of the light beam spot corresponds to a displaced position of the object under study.

The distance dX is measured, and the displacement dZ of the object under study is computed in correspondence to the distance dX and the incident glancing angle.

The subject system further comprises a camera coupled to the surface of the screen member to acquire optical images of the surface of the screen member containing the light beam spot at the position A and at the position B.

A data processor sub-system is embedded in the subject system. The data processor sub-system is configured for analyzing the acquired optical images of the surface of the screen member, and detecting the displacement of the light beam spot from the position A to the position B.

A feedback loop sub-system is operatively coupled to the data processor sub-system and the object under study. The feedback loop sub-system includes a driving mechanism coupled to the object under study for controlled displacing the object under study to its original position upon the displacement of the light beam spot from the position A to the position B which has been detected by the data processor sub-system.

The data processor sub-system controls the feedback loop to displace the object under study to its original position, and detects the return of the object under study to the original position when the light beam spot returns from the position B to the position A.

In a particular application to UHV chamber systems, the subject system uses the object under study as a substrate on a substrate holder in a vacuum chamber, which has a single optical window.

The screen member is positioned on the substrate holder inside the vacuum chamber, while the light emitting source, illuminator and camera are located outside the vacuum chamber. The light beam from the light emitting source, and the light from the illuminator are directed through the optical window on the screen member. The light beam incidence glancing angle remains at about 5 degree. The field of view of the camera is aligned to include the screen member and the reference element location on the screen.

The subject system further includes a variable intensity illuminator coupled to the surface of the screen member. The data processor sub-system is coupled to the variable intensity illuminator to control a brightness of the screen member's surface illumination.

The data processor sub-system is further configured to process a first acquired optical image corresponding to the original position of the object under study to determine a first maximum brightness location and a first brightness transition reference location at the acquired optical image, and to compute a reference distance between the first maximum brightness location and the first brightness transition reference location.

The subject system is capable of processing, by the data processor sub-system, at least a second acquired optical image to determine a second maximum brightness location and a second brightness transition reference location at the second acquired optical image. The data processor sub-system computes an adjusted distance between the second maximum brightness location and the second brightness transition location at the second acquired optical image and subsequently computes a difference between the reference distance of the first acquired optical image and the adjusted distance of the at least second acquired optical image. Subsequently, the feedback loop mechanism is controlled by the data processor sub-system to adjust position of the object under study if the difference between the reference distance and the adjusted distance deviates from zero.

The data processor sub-system is further configured to, prior to determining the reference distance, selecting, a region of interest (ROI) on the first acquired optical image. The ROI includes an X-Y array of individual pixels of the first acquired optical image having substantially a rectangular contour including a bottom edge of the screen member constituting a Reference Edge, right and left opposite sides disposed in parallel to a field of view of the camera, and the light beam spot, beginning from the left (or right) side of the ROI, scanning brightness of each vertical column of the individual pixels of the array thereof, and determining a location of the Reference Edge within each vertical column of the individual pixels.

The subject data processor sub-system is also capable of scanning each vertical column of the individual pixels of the array thereof for a maximum value of the brightness thereof, wherein the location of the light beam spot corresponds to a pixel having the maximum brightness.

An additional aspect of the subject invention addresses the capability of the subject system and method to detect contactlessly minor displacements of objects, and to facilitate a feedback signal for a motorized stage to move the object (also referred to herein as a component or a part) of interest in a Z-direction, thus attaining a control of the object position. In this embodiment, the subject system and method incorporate the laser spot position determination, a feedback loop, and a Z-stage. It supports a controlled movement of the component or can maintain a position of the component of interest at a pre-determined constant value.

Once a deviation of the laser spot position from the required position is detected and measured, a feedback signal corresponding to the deviation is sent to the Z-motor which subsequently displaces the Z-stage to return the laser spot to the required location.

The subject system and method may constitute an important tool for situations where the position of the surface normal to the Z-direction is critical. In one of the preferred embodiments of the invention, for example, in application with a Low-Angle-X-ray-Spectrometer (LAXS) system, an electron beam is incident on such a surface at low glancing angle (typically, 3-6 degree).

A location of the electron beam impact point on the surface is very sensitive to the surface Z-position, due to the low incidence angle. A variety of factors, such as changes in a pressure force, mechanical deformations, thermal expansion, or compression, etc., may cause the surface shifts (or drifts). For the LAXS operation however, it is important to maintain the impact point at the same constant spatial location for an extended time. The subject method and system may serve as an essential component in the LAXS systems, because they may facilitate such spatial stability of the electron beam impact point, and thus ensure a stability of the X-ray source position in such systems.

The subject system and method can provide for contactless, sensitive detection and control of position of a mechanical component in HV and/or UHV chambers. The subject system preferably includes a computer-aided routine which provides a feedback signal to move the object in question, which is used to adjust the object position, and/or to stabilize the object position.

These and other objects and advantages of the present invention will become more apparent from the reading of the Preferred Embodiment(s) in conjunction with accompanying Patent Drawings. The accompanying Patent Drawings that are incorporated herein and constitute a part of the specification, illustrate presently preferred embodiments of the invention, and, in conjunction with the description of the Preferred Embodiment(s) of the subject system and method, serve to explain the principles of the subject invention.

DETAILED DESCRIPTION OF THE PREFERRED EMBODIMENTS

Figure 1:
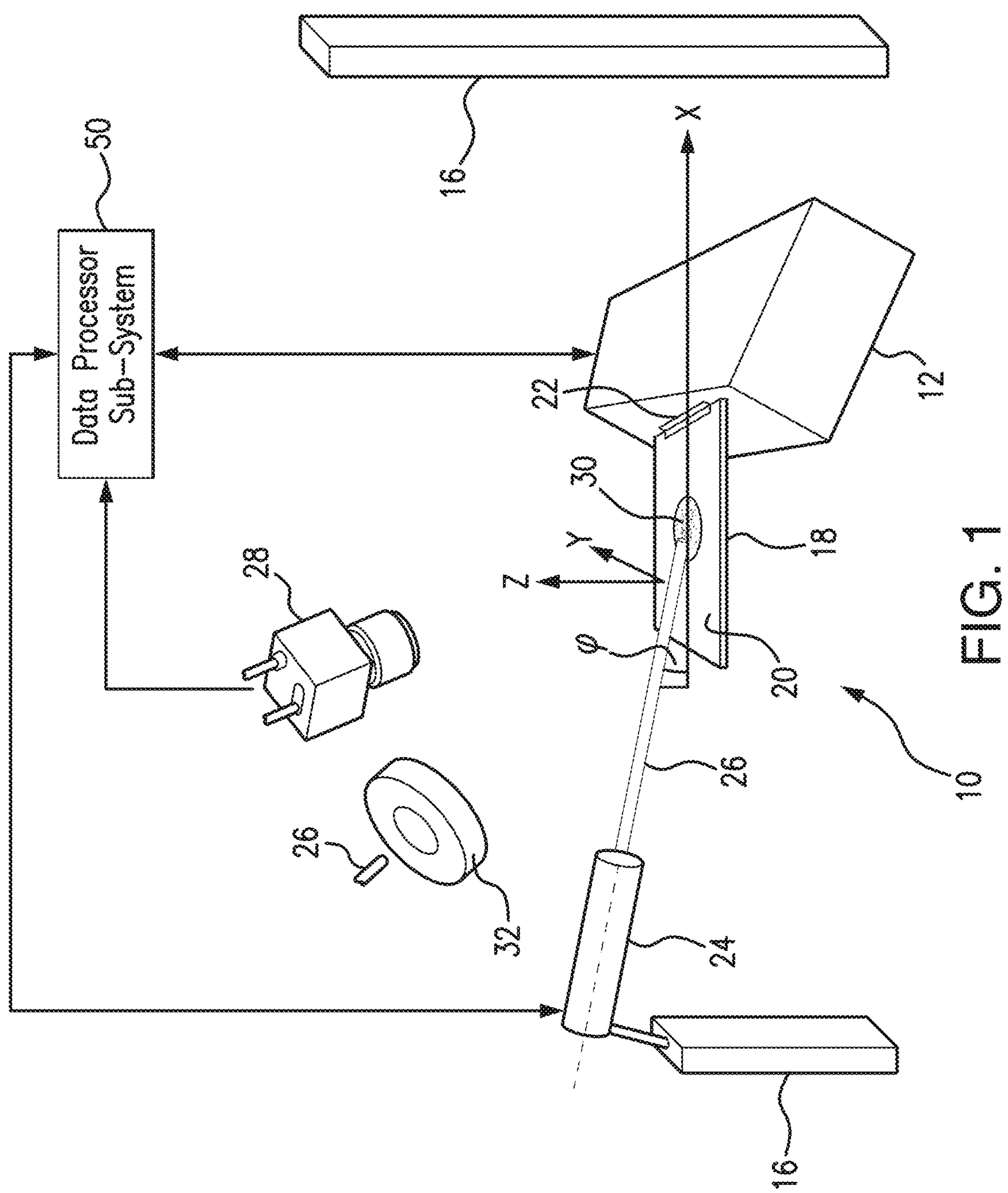
FIG. 1 is a schematic representation of the subject system supporting the present method.

Referring to FIGS. 1-5, the present system 10 is adapted for determining a position, as well as a shift in position, of an object 12. Particularly, in the depicted arrangement, the subject system 10 is adapted for determining and control of the position, as well as a shift of position, of the object 12 along the direction corresponding to the Z-axis.

The system 10 includes one or more of bases 16 which are stationary objects relative to which the position (displacement, shift, or drift) of the object 12 is determined and controlled in accordance with the principles of the present methodology, as will be detailed infra.

The system 10 further includes a screen member 18 (also referred to herein as a laser beam screen). The screen member 18 has a surface 20 to which the Z-axis is substantially normal.

A link 22 is formed between the object 12 and the surface 20 of the screen member 18. The link 22 is a rigid link which constitutes an interface between the object 12 and the screen member 18 which permits their joint movement.

A laser 24 (also referred to herein as an LED) is used in the subject system 10 to generate light (laser beam) 26 visible by a digital camera 28. The laser 24 is stationary relative to the base 16, as will be explained in the following paragraphs.

The laser beam 26 is focused on the surface 20 of the screen member 18. The laser beam 26 incidence on the screen member's surface 20 is characterized by a glancing angle φ. The laser beam 26, when focused on the surface 20 of the screen member 18, creates a laser beam spot 30 on the surface 20 on the screen member 18.

A variable intensity illuminator 32 is used in the system 10 to adjust the intensity of the illumination of the surface 20 of the screen member 18. The digital camera 28 is adapted to acquire images of the laser beam spot 30 and at least a portion of the surface 20 of the screen member 18 surrounding the laser beam spot 30.

Referring to FIG. 1, which depicts the general components of the subject system 10, the present technique is based on a spatial orientation of the laser beam 26 relative to the motion direction of interest (along the Z-axis).

A movement (shift, drift) of the object 12 is characterized as a change in its spatial position relative to another object, for example, the stationary base 16. In the subject method and system, the movement direction of interest coincides with the Z-direction, and thus, the surface 20 of the screen member 18 is arranged in perpendicular (normal) to the Z-direction.

The laser beam 26 is focused onto the surface 20 at the low glancing angle φ, forming the bright spot 30 on it. The surface 20 serves as a screen for visualizing the laser beam spot 30. Typically, the glancing angle φ ranging between 2 and 15 degrees can be effectively used for the purposes of the subject methodology. In a preferred embodiment, the glancing angle φ may be maintained between 3 and 10 degrees, with the most preferred value of the glancing angle about 5 degrees.

In the subject arrangement, it is preferred that the laser beam spot 30 is the brightest element, while the screen member 18 is maintained at an intermediate brightness level on a relatively dark background. Such control of the brightness of the surface 20 of the screen member 18 is accomplished by the variable illumination device 32.

The screen member 18 is solidly attached to the object 12 via the interface (link) 22, and moves in conjunction with the object 12.

The digital camera 28 acquires images emanating from at least a fraction of the screen member 18, including the laser beam spot 30.

Figure 2:
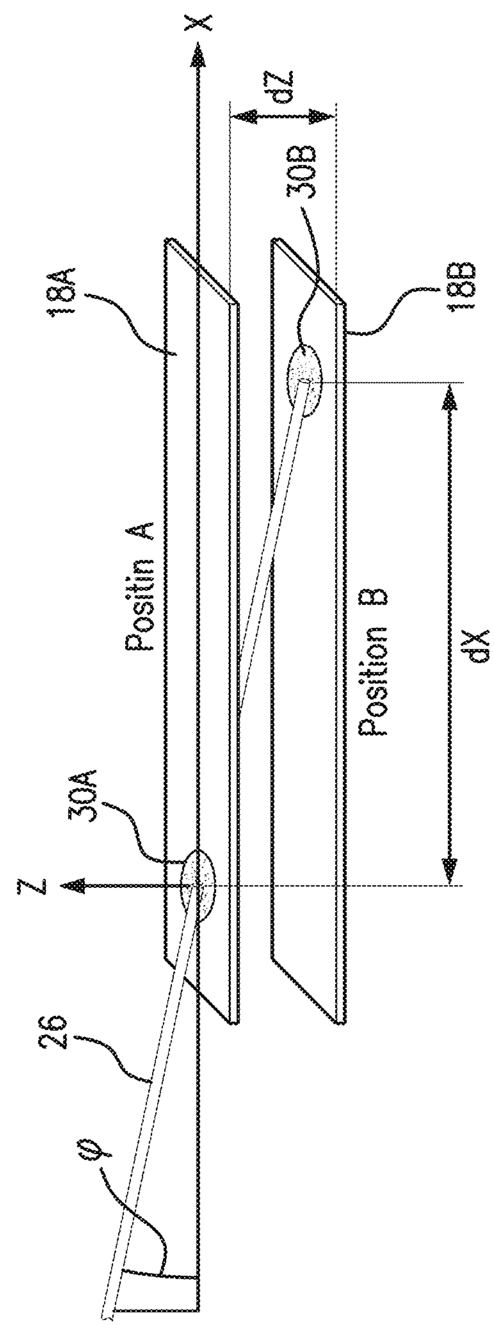
FIG. 2 illustrates the principles of attaining the enhanced displacement sensitivity when using low glancing incidence angles in the subject system.

FIG. 2 depicts the principle of the subject method when the screen member 18 and the object 12 are displaced a distance dZ from an original position A to a position B along the Z axis.

As detailed in FIG. 2, the screen member 18 moves along the Z-axis from its original position A (identified as the screen member 18A) to the position B (identified as the screen member 18B) along the Z-axis, thus being displaced a distance dZ therebetween. The stationary laser beam 26 is stationary incident on the surface 20 of the screen member 18A (at the position A) and forms thereat (at the position A) a laser beam spot 30A. The laser beam spot on the surface 20 of the screen member 18B, which is shifted by the distance dZ from the position A to the position B, is displaced horizontally (along the X-axis) and assumes the location 30B at the displaced screen member 18B (at the position B). As can be seen in FIG. 2, there is a displacement dX between the laser beam spots 30B and 30A existing as a result of the displacement of the screen member 18 in vertical direction (Z-axis) by a distance dZ from the position A to the position B.

Due to the small glancing angle φ of the laser beam incidence, the position of the laser beam spots 30A, 30B on the screen 18 (18A, 18B) is very sensitive to the displacement dZ of the screen 18 along the Z direction.

The shift dX between the location of the original laser beam spot 30A on the screen member 18A and the location of the laser beam spot 30B on the displaced screen member 18B is much greater than the shift dZ of the screen member 18 (corresponding to the displacement dZ of the object 12), because of the low glancing angle φ, $$\tan(\varphi) \ll 1 \quad \text{(Eq. 2)}$$

thus $$dX = dZ/\tan(\varphi) \gg dZ \quad \text{(Eq. 3)}$$

The small displacements (dZ) of the object 12 can be drastically "amplified" into the much greater shift distance dX of the spot 30 on the screen member 18, and can be detected in the screen and the spot image with high resolution and quantified in the subject scheme 10.

Figures 3A, 3B:
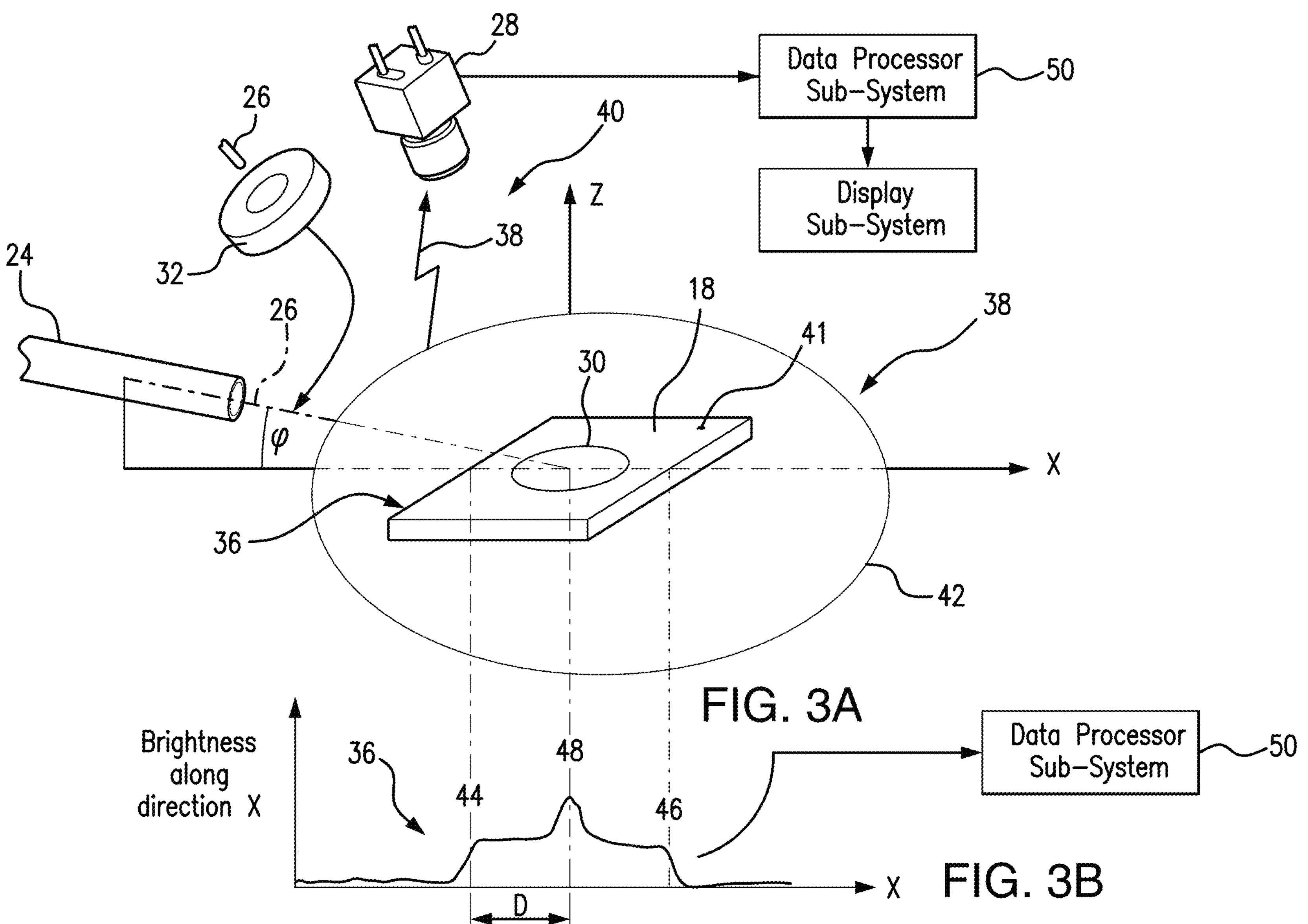
FIG. 3A is a schematic representation of the mechanism for obtaining brightness distribution profile along a line crossing the screen edge, screen surface and the laser spot, and measuring their locations.
FIG. 3B is a diagram representative of the brightness distribution in the acquired image.

In order to facilitate detection and quantification of the displacement of the laser beam spot 30 on the surface 20 of the screen member 18 caused by the displacement of the object 12 along the axis Z, a reference marker 36 is provided on the surface 20, as shown in FIG. 3A, which may be any feature that provides a brightness contrast, as shown in FIG. 3B.

FIG. 3A is a schematic representation of the routine for obtaining a brightness distribution profile (depicted in FIG. 3B) along a line crossing the edge of the screen member 18, the screen's surface 20, and the laser spot 30, and for measuring their location. Referring to FIGS. 1, 2, and 3A, the experimental set-up 40 includes the screen member 18 attached to an object 12 (not shown in FIG. 3A) with a plane 41 (surface 20) exposed to the laser illumination which is oriented in perpendicular to the direction of movement of interest along the Z-axis. The laser 24 generates a laser beam 26 focused onto the screen member 18 to create the laser spot 30. The variable intensity illuminator 32 is provided to control the brightness of the screen member 18.

The camera 28 is focused on the screen member 18 for acquiring an image 38 of the screen member 18, which includes the laser spot 30 which is the brightest element on the screen member 18. The image 38 also includes a portion of the screen member 18 surrounding the laser spot 30 which has a medium brightness, and a background 42 which is the darkest area in the image 38 acquired by the camera 28.

The laser beam 26 is incident on the surface of the screen member 18 at a small glancing angle φ. In the one-dimensional cross-section of the image 38 shown in FIGS. 3A-3B, the brightness variation along the X-direction indicates the presence of features that can be recognized and quantified. In the example shown in FIGS. 3A-3B, the "front" edge 44 or the "back" edge 46, of the screen member 18 perpendicular to the X-axis may serve as the reference marker 36. As shown in FIG. 3B, the location of the "front" edge 44 of the screen member 18 corresponds to transition from the screen member 18 brightness to the background 42 brightness. The "back" edge 46 of the screen member 18 corresponds to the transition from the screen member 18 brightness to the background 42 brightness. The distance D between the location of the laser beam spot center 48 (which is the brightest spot in the image 38) and the "front" edge 44 of the screen member 18 on the background may be measured for further processing. Similarly, the present methodology may use the "back" edge 46 (instead of the "front" edge 44) for the computations.

As shown in FIGS. 1, 3A-3B, 4, and 5, the subject system 10 is equipped with a data processor sub-system 50, which executes a position computation routine based on software designed (among its other routines) to measure the distance D between the laser spot center 48 (the brightest point on the diagram) and the edge 44 (or 46). The value dX of the shift of the laser beam spot 30 is equal to the change in the distance D, as the screen 18 and the object 12 move from the position A to position B (as depicted in FIG. 2). The amount of the object displacement dZ along the Z-direction is computed using the Eq. 3 (presented supra).

Using the reference marker 36 directly on the screen member 18 may be advantageous since such arrangement provides the measurement results independent of the frame of the camera image, and thus the movement of the camera 28 itself does not affect the measurement results.

The subject method and system are particularly useful in applications where a beam can be incident to a surface of an object under surveillance at a low-glancing angle, because such arrangements are quite sensitive to small displacements. Examples of such applications may include, but not limited to, electron beams diffraction tools, as well as the Low-Angle X-Ray Spectrometry Instrument (LAXS).

As one of the examples, the subject system and method are further described in the application to the Pulsed Laser Deposition (PLD) technique for creating thin or thick films on a substrate (wafer) operating in conjunction with the Low Angle X-ray Spectrometry (LAXS) system. The LAXS system 100, depicted in FIG. 4, includes a vacuum chamber 52 equipped with an electron beam source 54. The electron beam source generates a probing electron beam 56 which is incident on a substrate surface 58 (which is horizontal in this particular example) at a low glancing angle with a footprint 60 of the electron beam 56 on the substrate surface 58. The position of the footprint 60 of the electron beam 56 onto the substrate 58 is sensitive to the surface 58 position (shift, drift) along Z-axis (vertical in the example shown in FIG. 4).

The position may change over time relative to the vacuum chamber 52 due to a variety of reasons, such as, for example, mechanical deformation, pressure, thermal expansion, etc. However, maintaining the substrate position stability is important for proper LAXS operation. The subject method and system are uniquely suited for such purpose.

Figure 4:
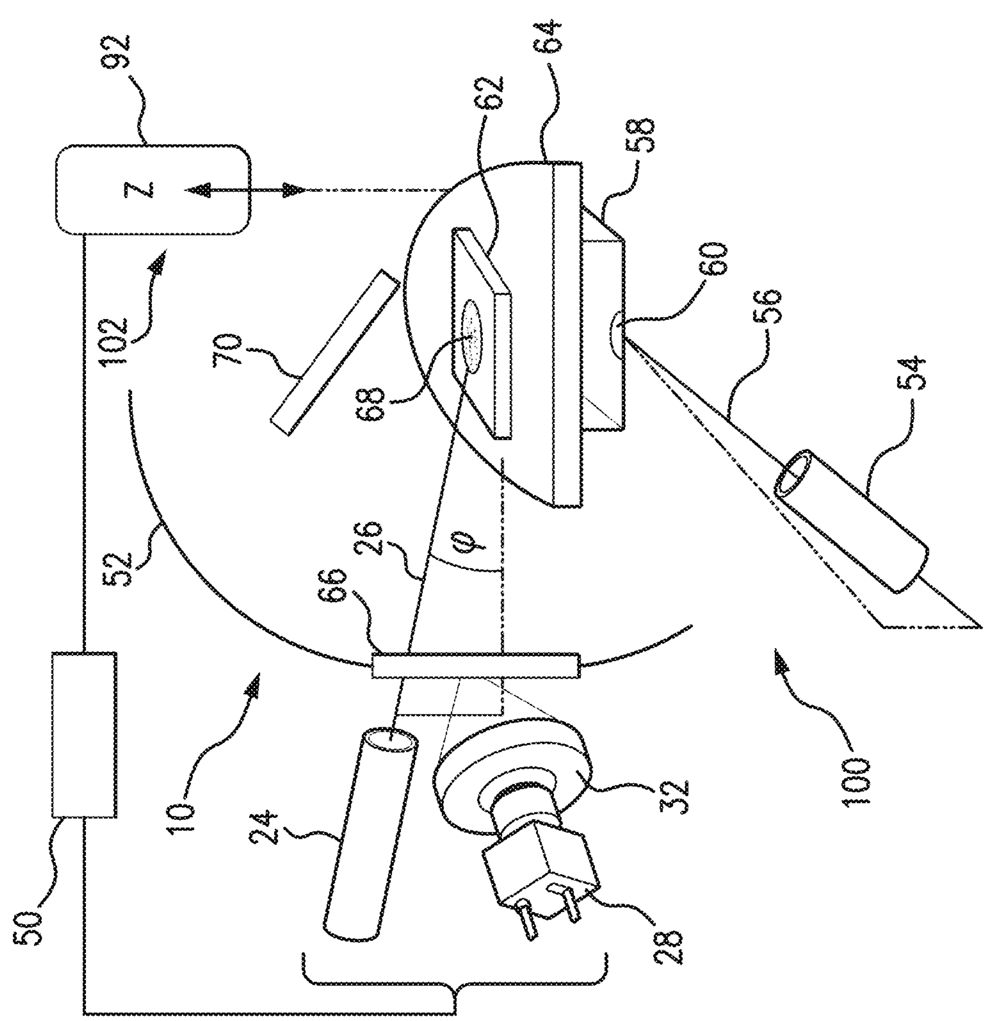
FIG. 4 is a schematic representation of a preferred embodiment of the subject system used in a Low Angle X-ray Spectrometer (LAXS) analytical system.

The subject method and system are adapted to control position of the substrate 58. As shown in FIG. 4, the subject system 10 which is operatively embedded in the LAXS system 100, includes at least one plate 62 (laser beam screen) which is attached to a substrate holder 64 to which the substrate 58 is secured. The system 10 embedded in the LAXS 100, also includes the units presented in FIGS. 1 and 3A, and described in previous paragraphs. These units include the laser 24, the camera 28, the variable light intensity illuminator 32, as well as the data processor sub-system 50.

The vacuum chamber 52 has an optical window 66. The laser 24 is positioned outside the vacuum chamber 52. The laser beam 26 produced by the laser 24 is directed to pass through the optical window 66 and is incident on the plate 62 attached to the substrate holder 64 at a small glancing angle φ, for example, 5 degrees.

The laser beam 26 creates a laser beam spot 68 on the surface of the plate 62. The plate 62 serves as a screen to visualize the laser beam spot 68. The plate surface 62 and the substrate surface 58 are preferably maintained in parallel relation to each other. Both of them are attached to the substrate holder 64, and can move in unison one with another, along the Z-direction.

A mirror 70 is positioned near the screen 62, and is oriented in such a way as to reflect the light from the screen 62 towards the camera 28. The illuminator 32 and camera 28 are positioned outside the vacuum chamber 52 in the vicinity of the optical window 66. Variable intensity illuminator light, reflected by the mirror 70 to the screen 62, controls the brightness of the screen surface 62. The light from the laser beam spot 68, the screen 62 and the background 42 (as shown in FIGS. 3A-3B), reflected by the mirror 70 to the camera 28, creates their images 38 (as shown in FIG. 3A) on a brightness-sensitive 2D sensor of the camera 28. Such geometrical relative disposition between the elements of the systems 10 and 100 permits to use a single relatively small optical window 66 in the vacuum chamber 52 for the substrate displacements detection and control, which is important for UHV systems and technological processes.

The subject system 10 also includes a feedback loop mechanism 102, which is controlled by the data processor sub-system 50 to react to a displacement of the substrate 58 and to return the substrate 58 to a desired (original) position when needed. The feedback loop mechanism 102 includes a driver (motor) 92 actuated by the data processor 50 to move the substrate holder 64 along the Z-direction when an unwanted deviation from the original position is detected.

Figure 5:
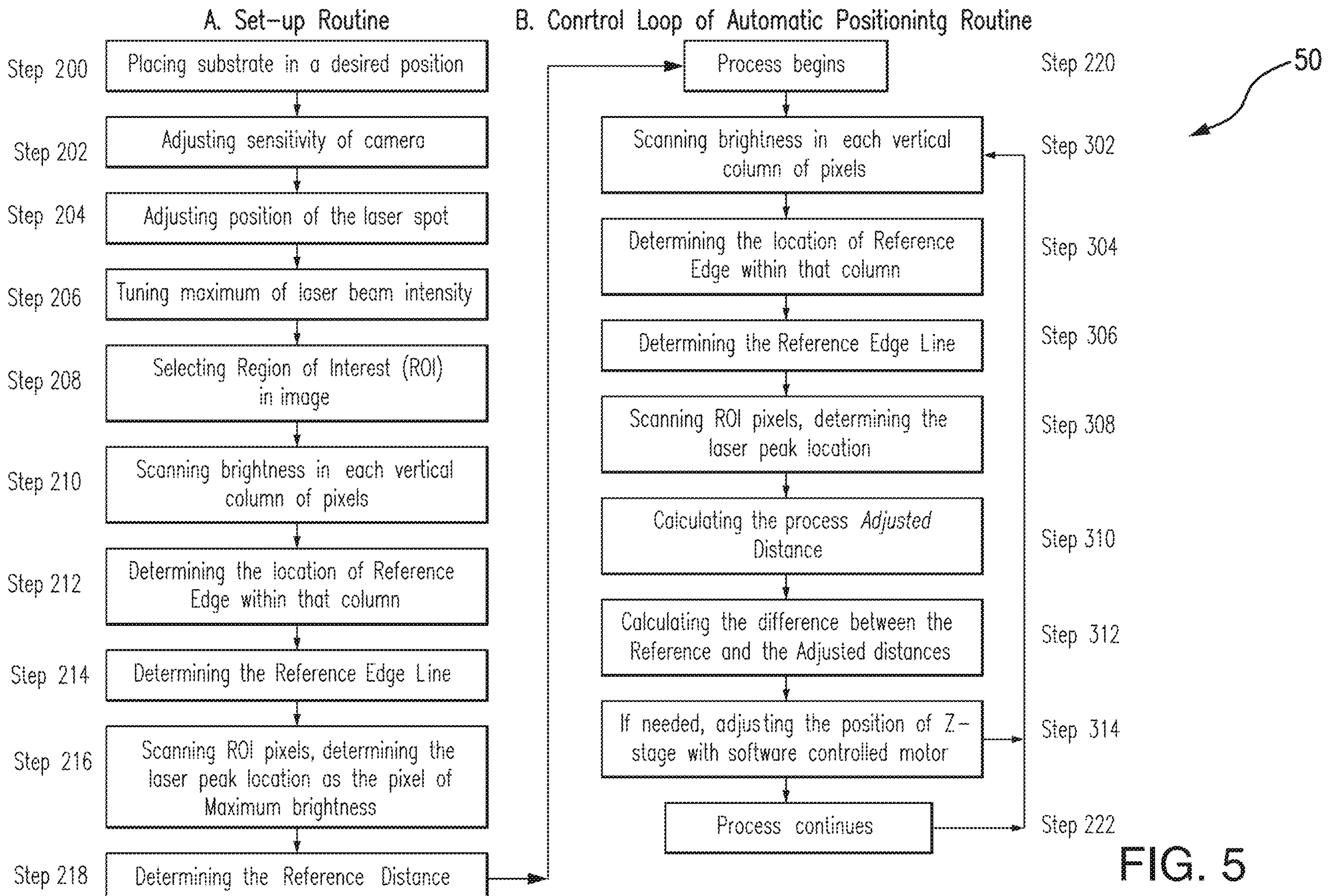
FIG. 5 is a schematic representation of the step-by step process for setting up and automatic control of the substrate position using the subject system and method.

The computer (data processor sub-system) 50 is included into the system 10 to control the laser 24, illuminator 32, camera 28, and the driver 92 through execution of the subject image processing routine as illustrated in FIG. 5. The results of the computation, as well as images acquired by the camera and analyzed by the image (data) processor sub-system 50, may be output at the display sub-system.

The step-by-step illustration of the present method depicted in FIG. 5, represents the execution of data processor sub-system (also referred to herein as images processor sub-system) 50 underlying the functionality of the subject routine which includes at least two interconnected parts:

(A) an Initial Manual Setup procedure (Set-Up Routine) that is followed by (B) a Computer-Aided Control loop of automatic positioning routine.

As presented in FIG. 5 in conjunction with the FIG. 4, the Setup procedure A, begins with Step 200 where a user places the substrate 58 in the vacuum chamber 52 in a desired position on the substrate holder 64. Subsequently, in Step 202, a user adjusts the sensitivity of the camera 28 to obtain the brightness of the background, which is the darkest area in an image 36, to be just above the threshold of the transition from the black (brightness 0%) to a dark-gray level.

In the following Step 204, the user adjusts the position of the focused laser beam spot 68 onto the screen 62 to be at a desirable distance from the screen member's Reference Edge 44 or 46 (as shown in FIGS. 3A-3B).

In the subsequent step 206, the user tunes the laser beam intensity to produce the maximum brightness of the laser beam spot 68 to be at the level of 70-90% of the camera sensor saturation (brightness 100%), within the sensor brightness dynamic range.

The user also adjusts the intensity of the illuminator 32 to control the brightness of the screen member 62 to be at the level of 20-30% of the dynamic range of the camera sensor. The setting up routine insures that brightness of the essential elements of the image, such as the Reference Edge 44 or 46 (shown in FIGS. 3A-3B) of the screen member 62 and the Maximum 48 of the laser spot peak (shown in FIG. 3B), are well within the dynamic range of the camera, so that in the subsequent automatic-control routine (B), the locations of the screen edge (44 or 46) and the laser spot maximum (48) can be reliably identified.

Figure 6B:
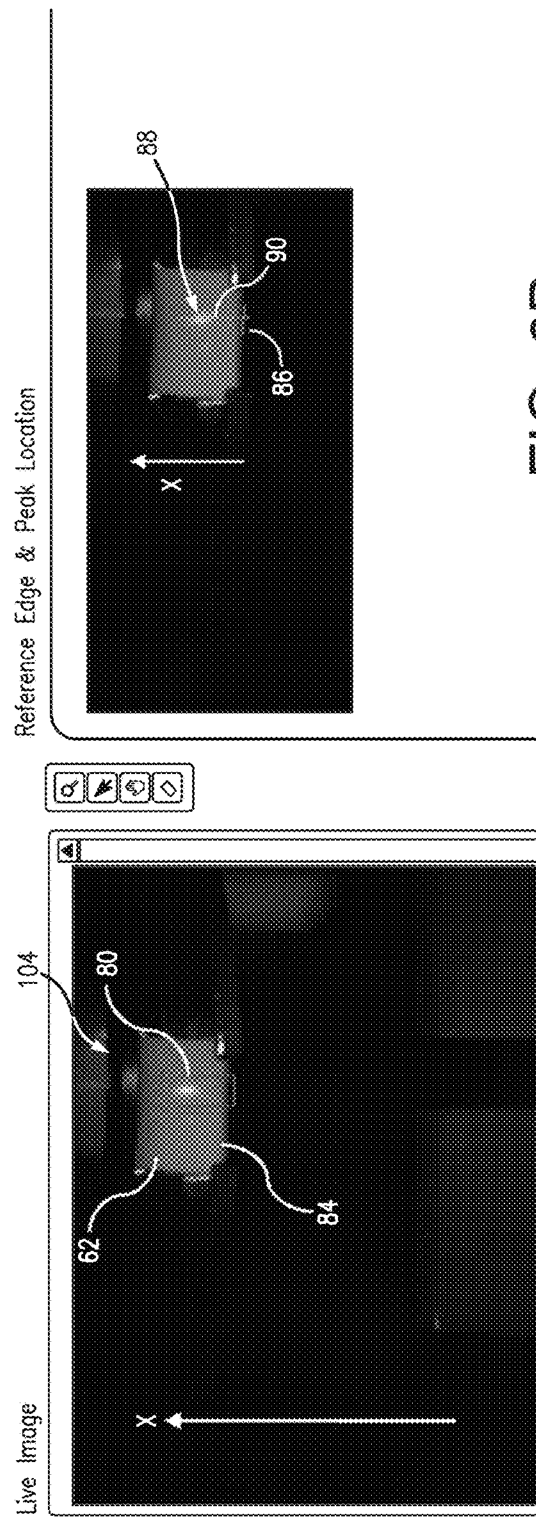
FIG. 6B further details the image processing routine by drawing a line of brightness distribution.
Figure 6A:
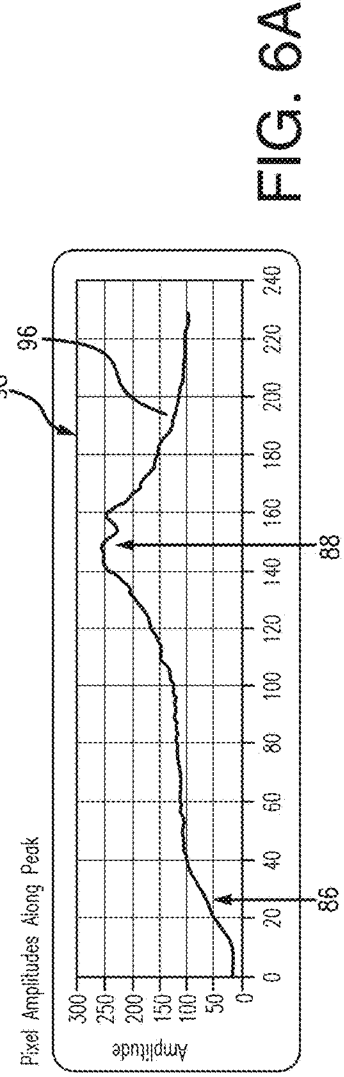
FIG. 6A is representative of the subject method image processing routine, based on selection of the Region of Interest (ROI) for determining the spot location on the screen.

In the subsequent step 208, as shown in FIG. 5 in conjunction with FIGS. 6A-6B, the user defines an area 80 within the image frame 104 which is to be analyzed by selecting the rectangular Region of Interest (ROI) 80 on the live camera image. The ROI 80 is an X by Y array of individual pixels of different brightness that represents the essential elements of the image acquired by the camera. As shown in FIG. 6A, the ROI 80 on the screen 62 includes the bottom edge 84 of the screen 62, which is used in the subject image analysis as a Reference Edge. The ROI 80 also includes the laser beam spot 68. The sides of the ROI 80 are parallel to the field of view of the camera, and the screen 62 may be rotated.

Subsequent to Step 208, the logic flows to Step 210, in which, beginning, for example, at the left edge (or the right edge) of the ROI 80, the data processor sub-system 50 scans each vertical line (column) of pixels in the ROI 80. Subsequently thereto, in Step 212, the logic 50 determines the location of the Reference Edge 84 within that column. In the following step 214, a fixed-point bilinear interpolation algorithm is used to locate the Reference Edge line to within sub-pixel accuracy which results in the line 86 shown in FIG. 6B.

Subsequent to Step 214, the image processor sub-system 50 in Step 216 scans each vertical line of the ROI's pixels for the maximum brightness value to determine the laser peak 88 location.

The software 50 further draws the vertical line 90 (shown in FIG. 6B) from the Reference Edge 86 through the laser peak 88. The Maximum of these values is the location of the laser peak 88 of the laser spot 68 on the screen 62.

The brightness distribution 96 along the line 90 (for quantification of brightness distribution) is shown in the graph 98 in FIGS. 6A-6B.

The distance, in pixels, from the Reference Edge 86 to the peak 88, along the vertical line of pixels that contains the peak is computed as the Reference Distance 94 in Step 218. The line graph 98 shown in FIG. 6A displays this line of pixels.

The computer 50 further records the location of the ROI 80. At specific periods of time the software underlying the operation of the data processor sub-system 50 acquires the live camera images, and automatically calculates the Adjusted Distance (in Steps 302-310). The computations in the control loop of automatic positioning routine B begin in Step 220, and are performed in Steps 302-314, similar to Steps 210-218 from the reference edge 84 to the peak 88, with the difference that in Steps 210-218 the logic analyzes the original image, while in Steps 302-314, the logic analyzes live camera images (different than the original image), and result in an adjusted distance vs. the reference distance.

If in step 312 the difference between the Reference Distance (computed in Step 218) and the Adjusted Distance (computed in Step 310) is greater than a threshold value, software communicates with the driver 92, shown in FIG. 4, that adjusts, in Step 314, the Z position of the substrate holder 64 to return to the original position to maintain the laser peak position stationary. This routine maintains the substrate surface 58 in a stable position.

Upon the position adjustment being executed in Step 314, the logic advances to Step 222 to continue the execution of the routine for the control loop automatic positioning, for which the procedure loops back to Step 302, so that at predetermined periods of time during the film deposition process, the software 50 executes the stage adjustment procedure presented in Steps 302-314.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for detection of displacement of an object in a predetermined direction of interest, comprising:

(a) attaching a screen member to an object under study, said screen member having a surface disposed substantially perpendicular to a predetermined motion direction of interest of said object under study;

(b) establishing a light emitting unit for generating a light beam;

(c) directing said light beam to said surface of said screen at a small incident glancing angle φ between said light beam and said surface of said screen member, wherein said light beam creates a light beam spot at a first position on said surface of said screen member, wherein, upon a displacement dZ of said object under study along said predetermined motion direction of interest, said light beam spot displaces from said first position a distance dX along said surface of said screen member to a second position, wherein said first position of said light beam spot corresponds to an original position of said object under study, and said second position of said light beam spot corresponds to a displaced position of said object under study;

(d) measuring said distance dX, and (e) computing said displacement dZ of said object under study in correspondence to said distance dX between said first and second positions of said light beam spot and said incident glancing angle φ.

2. The method of claim 1, further comprising:

in said step (e), computing said displacement dZ of said object under study as $$dZ=dX\cdot\tan\varphi.$$

3. The method of claim 1, further comprising:

operatively coupling a camera to said surface of said screen member to acquire optical images of said surface of said screen member, said optical images containing at least said light beam spot at said first position and said second position, operatively coupling a data processor sub-system to said camera, configuring said data processor sub-system for analyzing said acquired optical images of said surface of said screen member, and detecting said displacement of said light beam spot from said first position to said second position.

4. The method of claim 3, further comprising:

operatively coupling a feedback loop sub-system to said data processor sub-system and said object under study, wherein said feedback loop sub-system includes a driving mechanism coupled to said object under study for controlled displacement thereof, and displacing said object under study from said displaced position to said original position thereof by said feedback loop sub-system upon said displacement of said light beam spot from the first position to said second position has been detected by said data processor sub-system.

5. The method of claim 4, further comprising:

controlling said feedback loop, by said data processor sub-system, to displace said object under study to said original position thereof, and detecting the return of said object under study to said original position thereof when said light beam spot returns from said second position to said first position thereof.

6. The method of claim 4, further comprising:

coupling a variable intensity illuminator sub-system to said surface of said screen member, and operatively coupling said data processor sub-system to said variable intensity illuminator to control a brightness of the illumination of said surface of said screen member.

7. The method of claim 6, further comprising:

processing, by said data processor sub-system, a first acquired optical image corresponding to said original position of said object under study, said first acquired optical image including a first maximum brightness indicia and a first brightness transition reference indicia, determining, by said data processor sub-system, a location of said first maximum brightness indicia and a location of said first brightness transition reference indicia in said first acquired optical image, and processing, by said data processor sub-system, at least a second acquired optical image to determine a second maximum brightness indicia location and a second brightness transition reference indicia location at said at least second acquired optical image.

8. The method of claim 7, further comprising:

computing a reference distance between said first maximum brightness indicia location and said first brightness transition reference indicia location, and computing an adjusted distance between said second maximum brightness indicia location and said second brightness transition indicia location at said at least second acquired optical image.

9. The method of claim 8, further comprising:

computing, by said data processor sub-system, a difference between said reference distance of said first acquired optical image and said adjusted distance of said at least second acquired optical image, and controlling said feedback loop mechanism, by said data processor sub-system, to adjust a position of said object under study if said difference between said reference distance and said adjusted distance deviates from zero by a predetermined value.

10. The method of claim 9, further comprising:

prior to determining said reference distance, selecting, by said data processor sub-system, a region of interest (ROI) on said first acquired optical image, said ROI including an X-Y array of individual pixels of said first acquired optical image having substantially a rectangular contour including a bottom edge of said screen constituting a Reference Edge, right and left opposite sides disposed in parallel to a field of view of said camera, and said light beam spot, beginning from at least one of said left and right sides of said ROI, scanning brightness of each vertical column of the individual pixels of said array thereof, and determining a location of said Reference Edge within said each vertical column of the individual pixels.

11. The method of claim 10, further comprising:

scanning said each vertical column of the individual pixels of said array thereof for a maximum value of the brightness thereof, wherein the location of said light beam spot corresponds to a pixel having the maximum brightness.

12. The method of claim 10, further comprising:

determining said location of said Reference Edge within a sub-pixel accuracy by a fixed-point bi-linear interpolation routine.

13. The method of claim 11, further comprising:

drawing, by said data processor sub-system, a straight vertical line connecting said pixels of the maximum brightness and said Reference Edge, wherein said Reference Distance is computed as a distance between said pixels of the maximum brightness and said Reference Edge along said vertical line.

14. The method of claim 9, further comprising:

prior to determining said adjusted distance, selecting, by said data processor sub-system, a second region of interest (ROI) on said second acquired optical image, said second ROI including an X-Y array of individual pixels of said second acquired optical image having substantially a rectangular contour including a bottom edge of said screen constituting a Reference Edge, right and left opposite sides disposed in parallel to a field of view of said camera, and said light beam spot, beginning from at least one of said left and right sides of said second ROI, scanning brightness of each vertical column of the individual pixels of said array thereof, and determining a location of said Reference Edge within said each vertical column of the individual pixels, scanning said each vertical column of the individual pixels of said array thereof for a maximum value of the brightness thereof, wherein the location of said light beam spot corresponds to a pixel having the maximum brightness, and drawing, by said data processor sub-system, a straight vertical line connecting said pixel of the maximum brightness and said Reference Edge, wherein said Adjusted Distance is computed as a distance between said pixel of the maximum brightness and said Reference Edge along said vertical line.

15. The method of claim 6, further comprising:

positioning a mirror in proximity to said screen member to reflect the light produced by said variable intensity illuminator sub-system to said screen member to control said surface brightness of said screen member, and to form a light collection channel to obtain said optical image including the light from beam spot, light from said screen member, light from a background field reflected by said mirror to said camera, said light collection channel being substantially parallel to said light beam.

16. The method of claim 1, wherein said object under study is a substrate, further comprising:

positioning said substrate on a substrate holder in a vacuum chamber, forming a single optical window in a wall of said chamber, positioning said screen member on said substrate holder, positioning said light emitting source, illuminator and camera outside said vacuum chamber, directing said light beam from said light emitting source, and light from said variable intensity illuminator sub-system through said optical window on said screen member, aligning the field of view of said camera with said window, and setting said glancing angle of said light beam to about 5 degrees.

17. A method for controlling a substrate position in surface analysis systems using low glancing angle incident beams, comprising:

(a) attaching a screen member to a substrate, said screen member having a surface disposed substantially perpendicular to a predetermined motion direction of interest of said substrate;

(b) providing a light emitting unit for generating a light beam;

(c) directing said light beam to said surface of said screen member at a small incident glancing angle φ between said light beam and said surface of said screen member, wherein said light beam creating a light beam spot at a first position on said surface of said screen member, wherein, upon a displacement dZ of said substrate along said predetermined direction of interest, said light beam spot displaces from said first position a distance dX along said surface of said screen member to a second position, wherein said first position of said light beam spot corresponds to an original position of said substrate, and said second position of said light beam spot corresponds to a displaced position of said substrate;

(d) operatively coupling a camera to said surface of said screen member to acquire optical images of said surface of said screen member containing said light beam spot at said first position and said second position;

(e) operatively coupling a data processor sub-system to said camera;

(f) configuring said data processor sub-system for analyzing said acquired optical images of said surface of said screen member to detect the displacement of said substrate based on the displacement of said light beam spot from said first position to said second position;

(g) operatively coupling a feedback loop sub-system to said data processor sub-system and said substrate, wherein said feedback loop sub-system includes a driving mechanism operatively coupled to said substrate for controlled displacement thereof;

(h) displacing said substrate from said displaced position to said original position thereof by said feedback loop sub-system upon said displacement of said light beam spot from the first position to said second position has been detected by said data processor sub-system; and (i) detecting the return of said substrate to said original position thereof when said data processor sub-system determines the light beam spot return from said second position to said first position.

18. The method of claim 17, further comprising:

coupling a variable intensity illuminator to said surface of said screen member, and operatively coupling said data processor sub-system to said variable intensity illuminator to control a brightness of said surface of said screen member illumination;

configuring said data processor sub-system to process a first acquired optical image corresponding to said original position of said substrate to determine a first maximum brightness indicia location and a first brightness transition reference indicia location at said acquired optical image, computing a reference distance between said first maximum brightness location and said first brightness transition reference indicia location, processing, by said data processor sub-system, at least a second acquired optical image to determine a second maximum brightness indicia location and a second brightness transition reference indicia location at said at least second acquired optical image, computing an adjusted distance between said second maximum brightness indicia location and said second brightness transition indicia location at said at least second acquired optical image, computing, by said data processor sub-system, a difference between said reference distance of said first acquired optical image and said adjusted distance of said at least second acquired optical image, and controlling said feedback loop mechanism by said data processor sub-system to adjust position of said substrate if said difference between said reference distance and said adjusted distance deviates from zero.

19. A system for detection of a displacement of an object under study in a predetermined motion direction of interest, comprising:

a screen member secured to an object under study, said screen member having a surface disposed substantially in perpendicular to a predetermined motion direction of interest of said object under study, a light emitting unit for generating a light beam, said light beam being directed to said surface of said screen member at a small incident glancing angle φ between said light beam and said surface of said screen member, wherein said light beam creates a light beam spot at a first position on said surface of said screen member, wherein, upon a displacement dZ of said object under study along said predetermined motion direction of interest, said light beam spot displaces a distance dX along said surface of said screen member to a second position, said first and second positions of said light beam spot corresponding to an original and a displaced positions of said object under study, respectively;

a camera operatively coupled to said surface of said screen member to acquire optical images of said surface of said screen member containing said light beam spot at said first position and at least said second position; and a data processor sub-system configured for analyzing said acquired optical images of said surface of said screen member, said data processor sub-system being configured to measure said distance dX, computing said displacement dZ of said object under study in correspondence to said distance dX and said incident glancing angle, thereby detecting the displacement of said object under study.

20. The system of claim 19, further comprising:

a feedback loop sub-system operatively coupled to said data processor sub-system and said object under study, wherein said feedback loop sub-system includes a driving mechanism coupled to said object under study to control a positional state thereof by displacing said object under study from said displaced position to said original position thereof upon said displacement of said light beam spot from said first position to said second position has been detected by said data processor sub-system;

said data processor sub-system being further configured to:

process a first acquired optical image corresponding to said original position of said object under study to determine a first maximum brightness indicia location and a first brightness transition reference indicia location at said acquired optical image, compute a reference distance between said first maximum brightness indicia location and said first brightness transition reference indicia location, to process at least a second acquired optical image to determine a second maximum brightness indicia location and a second brightness transition reference indicia location at said at least second acquired optical image, computing an adjusted distance between said second maximum brightness indicia location and said second brightness transition indicia location at said at least second acquired optical image, to compute a difference between said reference distance of said first acquired optical image and said adjusted distance of said at least second acquired optical image, and to control said feedback loop mechanism to adjust position of said object under study if said difference between said reference distance and said adjusted distance deviates from zero by a predetermined value.

* * * * *